April 12, 1966 F. J. JONES 3,245,447
MEAT SLICER
Filed Nov. 26, 1963 4 Sheets-Sheet 1
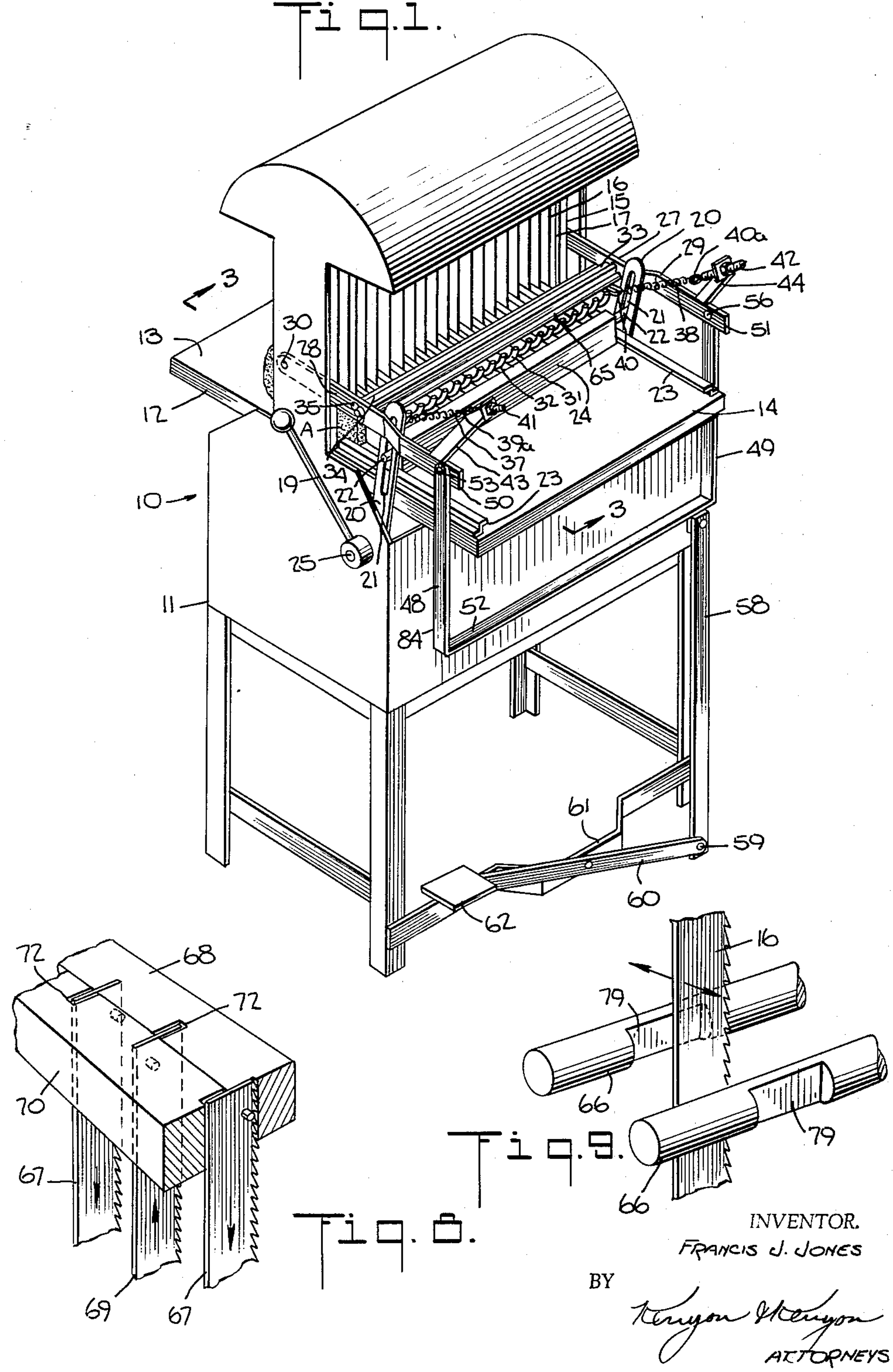
INVENTOR.
FRANCIS J. JONES
BY
Kenyon & Kenyon
ATTORNEYS April 12, 1966 F. J. JONES 3,245,447
MEAT SLICER
Filed Nov. 26, 1963 4 Sheets-Sheet 2
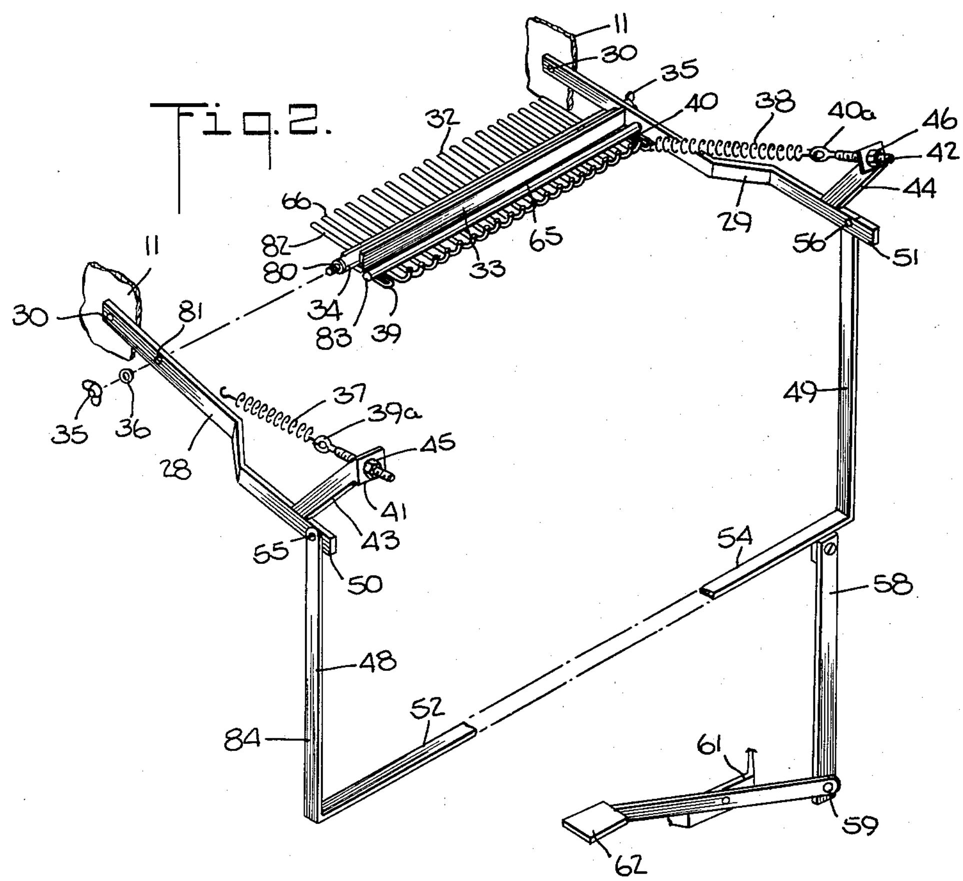
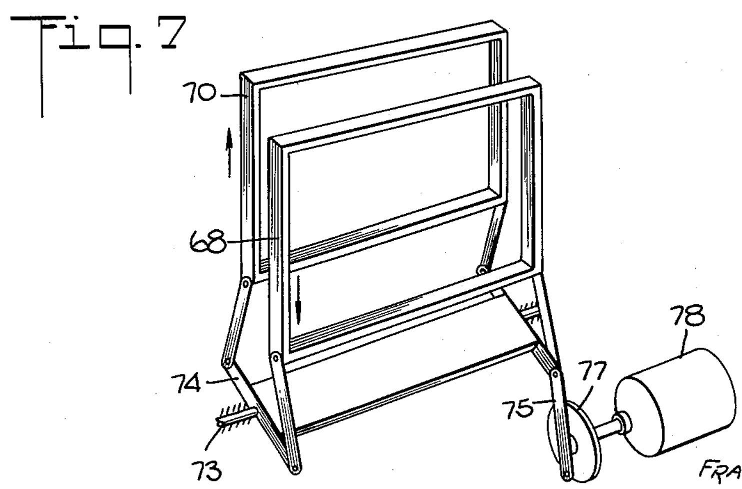
INVENTOR.
FRANCIS J. JONES
BY Kenyon & Kenyon
ATTORNEYS April 12, 1966 F. J. JONES 3,245,447
MEAT SLICER
Filed Nov. 26, 1963 4 Sheets-Sheet 3
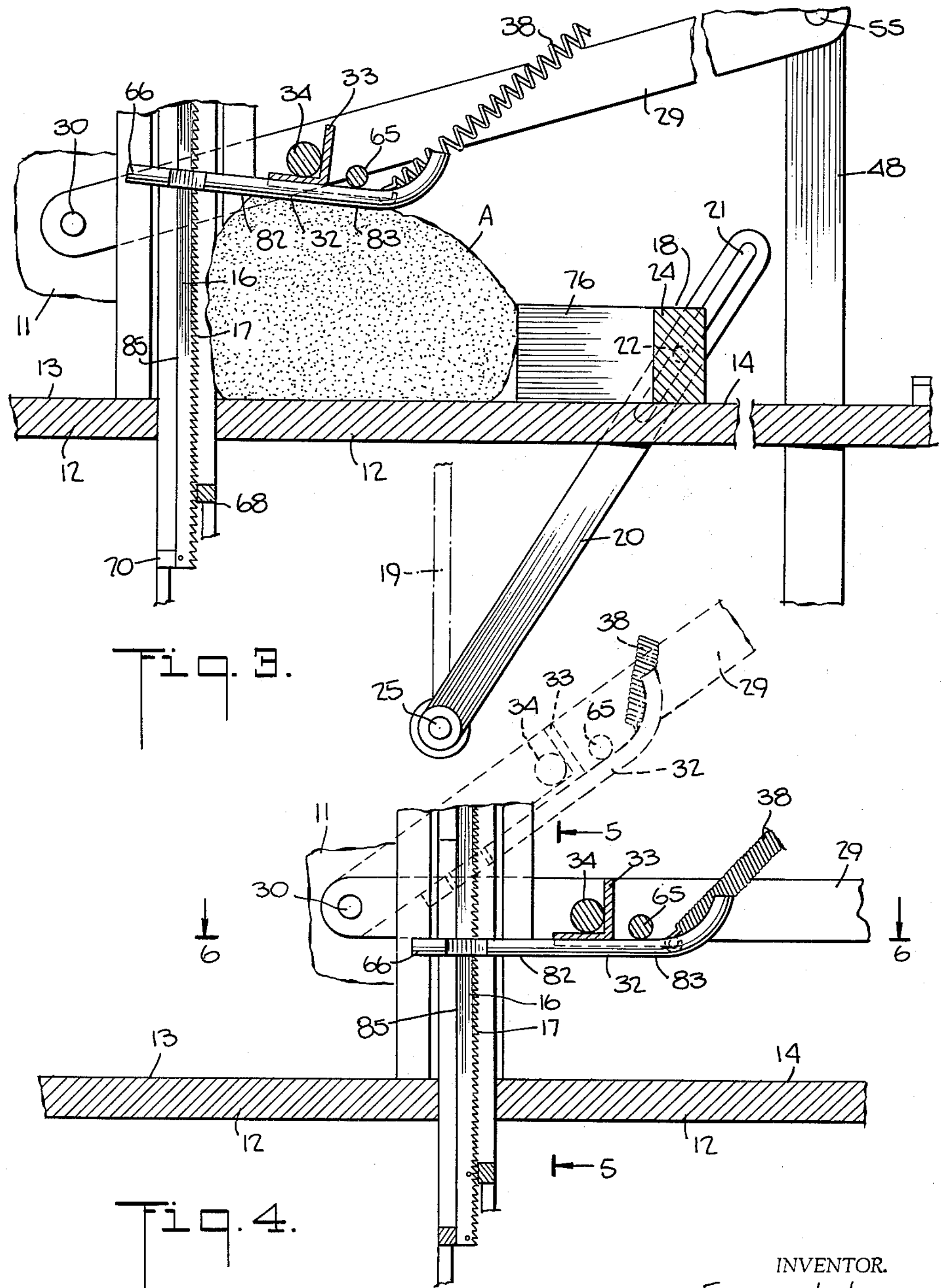
INVENTOR.
FRANCIS J. JONES
BY Kenyon & Kenyon
ATTORNEYS

MEAT SLICER

INVENTOR.
FRANCIS J. JONES
BY Kenyon & Kenyon
ATTORNEYS

United States Patent Office 3,245,447

Patented Apr. 12, 1966

3,245,447
MEAT SLICER

Francis J. Jones, Indianapolis, Ind., assignor to Hygrade Food Products Corporation, Detroit, Mich., a corporation of New York Filed Nov. 26, 1963, Ser. No. 326,128
9 Claims. (Cl. 146—153)

This invention relates to meat slicers and more particularly to a multi-blade meat slicer for cutting a meat section into a plurality of slices.

There is a large demand by consumers for various cuts of meats in sliced form. For example, it is a common practice to market meat sections such as pork loins, butts and various hams in the form of slices. Ordinarily such slices are prepared by the retail supplier using a single blade saw, manual or automatic, to cut individual slices from the meat section. Because this method is time consuming and requires individual handling of each slice, the marketing of pre-packaged sliced meat sections has not achieved commercial importance. The large labor expense involved has generally prevented meat packers from merchandising sliced meats.

It is therefore an object of the present invention to provide a meat slicer that will simultaneously cut a whole meat section into a plurality of individual slices so that the sliced section emerges from the slicer in a form suitable for packaging.

Another object of the present invention is to provide a meat slicer embodying a plurality of oscillating saw blades for cutting a meat section into a plurality of individual slices in one operation.

A further object of the present invention is to provide a meat slicer for cutting a meat section into a plurality of slices which embodies a plurality of oscillating saw blades and means for firmly holding the meat section during the slicing operation.

Briefly stated, one embodiment of a device according to the present invention is an apparatus for cutting a meat section into a plurality of slices comprising a frame, a table attached to said frame having a first section for receiving said meat section and a second section for receiving said meat section in sliced form, a plurality of vertical equally spaced saw blades, power means for oscillating said saw blades in a vertical direction, a movable meat carriage extending across said first section of said table so that said carriage is parallel to the plane defined by the edges of said saw blades, said carriage being initially spaced apart from said saw blades, first lever means connected to said carriage for moving carriage forward from its initial position towards the cutting edges of said saw blades, and meat holding means associated with said first section of said table comprising a pair of arm bars, each being pivotally connected at one end thereof to said frame at opposite sides of said table, a first support bar pivotally interconnected between said arm bars, a series of equally spaced parallel rods integrally attached to said first support bar at right angles thereto, said rods being oriented so that one end of each rod is disposed between adjacent saw blades and extends beyond the non-cutting edges of said blades and the other end of each bar is positioned over said first section of said table, spring means for biasing said pivotal series of rods in a plane generally parallel to said opposed arm bars and adapted to resist a force applied to the underside of said rods, and lever means supported by said frame for lifting said arm bars at the end thereof opposite said pivoted end.

The invention relates to the combination of elements as hereinafter more particularly described with reference to the drawings, in which:

FIG. 1 is a perspective view of one embodiment of the apparatus according to the invention;

FIG. 2 is a partially exploded perspective view of the meat holding device of the apparatus of FIG. 1;

FIG. 3 is a partial sectional elevation view taken along lines 3—3 of FIG. 1, showing the meat holding device thereof in two different positions;

FIG. 4 is a partial sectional elevation view similar to FIG. 3 showing the meat holding device of the apparatus in the cutting position;

FIG. 7 is a perspective view of saw blade frames adapted for use in the embodiment of FIG. 1;

FIG. 8 is a partial perspective view showing the relationship of the saw blades to the saw blade frames; and FIG. 9 is a partial perspective view showing detail of the apparatus of FIG. 7 in the vicinity of the saw blades.

Figure 5:
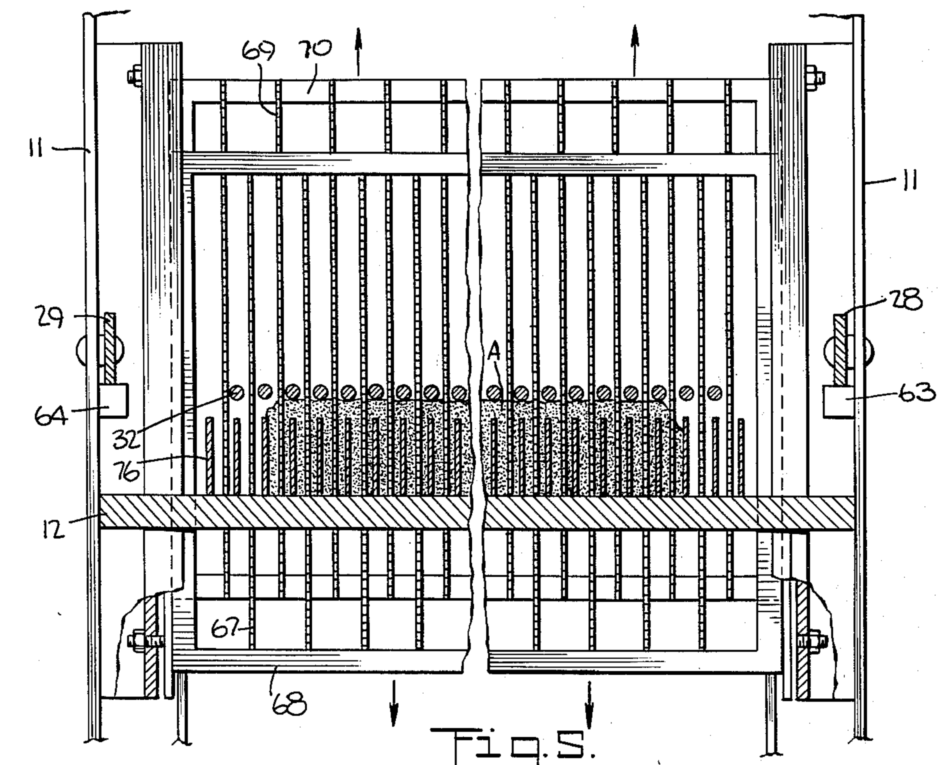
FIG. 5 is a cross-sectional elevational view taken along the lines of 5—5 of FIG. 4.

Referring now particularly to the embodiment depicted in FIG. 1, the apparatus 10 has a frame 11 which supports a table 12 having a feed side 14 and delivery side 13. The table 12 constitutes the working surface upon which the meat sections are processed as hereinafter described.

Approximately in the middle of table 12 is a slicing assembly 15 which has a series of equally spaced, vertically aligned saw blades 16, the cutting edges 17 of which face the feed side 14 of table 12. Saw blades 16 are adapted to oscillate in a vertical direction. One arrangement for actuating saw blades 16 is described below in detail with reference to FIGS. 5, 7 and 8.

Feed side 14 of table 12 is utilized to receive a whole meat section A. Associated with feed side 14 is a meat carriage 18. The purpose of meat carriage 18 is to force meat section A into cutting edges 17 of blades 16. Consequently, carriage 18 is arranged to move in a direction perpendicular to the vertical plane defined by edges 17 of saw blades 16.

Carriage 18 rests upon the feed side 14 of table 12 and is arranged to slide across it. One convenient manner of accomplishing this end is shown in the embodiment in the drawings. Ram 24 of carriage 18 has pins 22 on each end which engage slots 21 in members 20. Slotted members 20 are each connected at their respective lower ends (FIG. 3) to a common shaft 25. Shaft 25 extends through frame 11 and is connected to lever 19.

On each end of ram 24 of carriage 18 is a tongue member 26 (see FIG. 6) which is slideably engaged in the grooved members 23 which are secured to feed side 14 of table 12. Consequently, as lever 19 is rotated counterclockwise, ram 24 moves toward saw blades 16, sliding along feed side 14 of table 12 in a horizontal plane. Such movement of ram 24 forces meat section A into the cutting edges 17 of blades 16.

Figure 6:
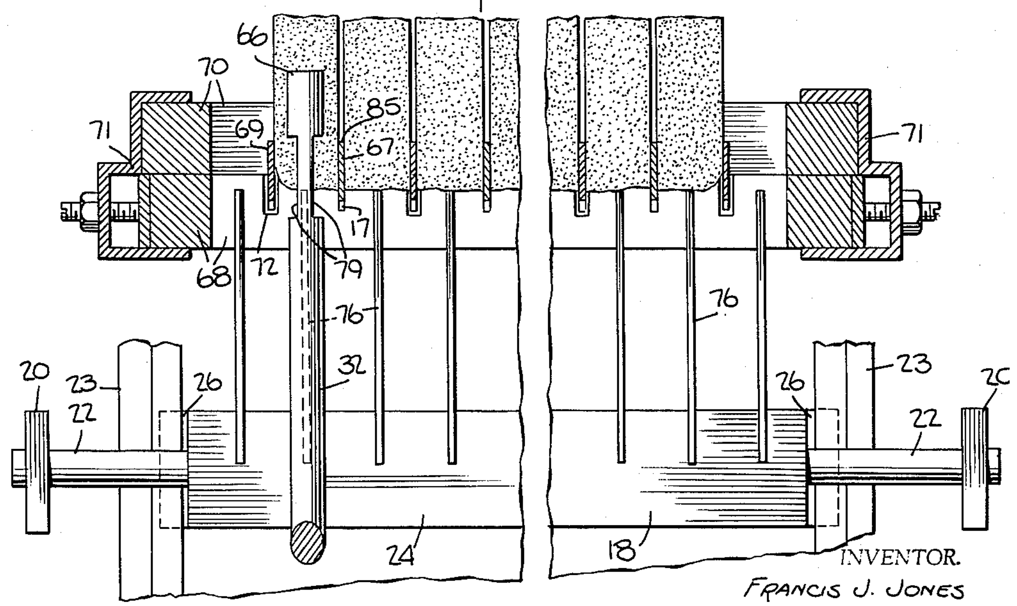
FIG. 6 is a cross-sectional plan view taken along lines 6—6 of FIG. 4 and showing the meat section substantially cut.

As will be described more particularly hereinafter, the carriage 18 is adapted to force meat section A through oscillating saw blades 16. One method of accomplishing this, as shown in FIG. 6, is to provide ram 24 of carriage 18 with a spaced series of parallel fin members 76 which are located to pass between adjacent saw blades 16.

Associated generally with feed side 14 of table 12 is a meat holding assembly 27. Assembly 27 is best shown in FIGS. 1 and 2. FIG. 2 shows the details of assembly 27, and FIG. 1 shows its cooperation with the other elements of apparatus 10.

Holding assembly 27 has a pair of generally parallel shaped arms 28 and 29, each of which is pivotally connected at one end to frame 11 by a separate pin 30. Pins 30 are located slightly above table 12 and slightly off-center in direction of the delivery side 13 of table 12.

Located between arms 28 and 29 is the meat contacting pressure plate 31 of assembly 27. Plate 31 comprises a series of spaced parallel fingers or rods 32 which operate as an integral unit by reason of attachment, for example by welding, to angle support 33 as shown in FIG. 2. Rods 32 are located beneath support 33 and are connected together approximately midway between their respective ends.

It is very desirable for the series of rods 32 to be pivotable about a horizontal axis. To this end, bar 34 is connected to support 33. The ends 80 of bar 34 are threaded and engaged holes 81 in arms 28 and 29. Threaded wing nuts 35 are used with threaded hexagonal nuts 36 to provide a locking action. Nuts 35 and 36 are adjusted to permit rotation of bar 34. Thus, rods 32 are pivotable about bar 34.

The portions of rods 32 on the side of bar 34 closest to blades 16 are termed the "feeding" portions are denoted by reference numerals 82. The portions of rods 32 on the side of bar 34 away from blades 16 are termed the "loading" portions and are denoted by reference numeral 83. Although the feeding portion 82 is necessarily in the form of fingers or rods adapted to interpose between adjacent saw blades 16; the loading portion 83 is not so limited and may be composed of a single continuous unit.

Springs 37 and 38 are provided as part of the assembly 27 to maintain pivotable rods 32 in a generally horizontal plane. To accomplish this, springs 37 and 38 are attached at one end to eyelets 39 and 40, respectively, which in turn are attached to support 33 on the loading portions side 83 of rods 32. The other ends of each of springs 37 and 38 are connected to eyelets 39*a* and 40*a* on threaded bolts 41 and 42, respectively. Threaded bolts 41 and 42 are connected to extensions 43 and 44, respectively, by nuts 45 and 46. Extensions 43 and 44 are connected to arms 28 and 29, respectively.

The nuts 45 and 46 are adjusted so that the tension in springs 37, 38 maintains rods 32 in a generally horizontal plane. Because of the angular position of springs 37 and 38, plate 31 tends to assume a horizontal orientation and resists pivoting in either direction.

Attached to ends 50, 51 of arms 28, 29 is a lever assembly 84 for raising and lowering arms 28, 29 about pins 30. Lever assembly 84 consists of a bracket 52 having vertical members 48, 49 which are respectively connected by pins 55, 56 to arms 28, 29. Bracket 52 has a horizontal member 54 connecting members 48, 49 as shown. Vertical connecting member 58 is connected to one end of member 54. The lower end of vertical member 58 is pivotally attached at 59 to a lever bar 60. Bar 60 is pivotally connected to frame member 61 and the free end of lever 60 is provided with a foot pedal 62.

Depression of foot pedal 62 causes the bracket 52 to pivot arms 28 and 29 in a counter-clockwise direction, and this lifts plate 31 from its normal rest position.

Pins 63 and 64 are connected to frame 11 (see FIG. 5) and furnish support for arms 28 and 29, respectively. Pins 63 and 64 are located so that arms 28 and 29 are maintained in a generally horizontal resting position.

FIG. 4 shows the two positions of arms 28, 29. When foot pedal 62 is depressed fully, arms 28, 29 are raised to the position shown by the dotted lines of FIG. 4. When the foot pedal 62 is released, arms 28, 29 assume the generally horizontal rest position indicated by the solid lines. Rods 32, of course, move with arms 28, 29.

As will be described more fully hereinafter, apparatus 27 is adapted to hold meat section A during the cutting thereof. Initially meat section A is placed underneath rods 32 when plate 31 is in the raised position. A significant rise in rods 32 in the vicinity of the blades 16 permits even a relatively large meat section to be initially placed in a position immediately adjacent saw blades 16, thus facilitating efficient introduction of meat section A into the blades 16 by carriage 18 (see FIG. 3). Therefore, pins 30 are located slightly off-center in order to maintain some distance between the pivot pins 30 and the saw blades 16. As a consequence there is obtained the desired significant rise of rods 32 in the vicinity of blades 16 when foot pedal 62 is depressed.

The ends of rods 32 residing on the loading portions 83 are preferably given a slight upward curvature, as shown. This helps prevent any binding or snagging of meat section A on rods 32, and facilitates its smooth engagement with the saw blades 16 under the influence of the meat carriage 18. A stabilizing bar 65 is welded to rods 32 across the loading portion thereof in order to inhibit the tendency of the rods 32 to spread apart under the influence of the upward push exerted by a loaded meat section A.

When holding assembly 27 is raised, and meat section A placed beneath rods 32, the weight of the assembly 27 is applied to meat section A. The meat section A in turn pushes against the rods 32. However, the rods themselves pivot against the action of springs 37, 38 and as the meat is forced underneath the rods by carriage 18, the springs exert additional pressure against the meat section. Thus, FIG. 3 shows a meat section which in pushing up against the feeding portions 82 of rods 32, and as a consequence the feeding portions 82 of rods 32 pivots upward out of the general alignment with arm bars 28, 29. The springs 37, 38 in turn, exert considerable pressure against the meat section in an effort to return the rods 32 to their initial plane.

Now rods 32 are spaced, as shown in FIGS. 5 and 6, so that each rod 32 is disposed between adjacent saw blades 16, but not touching them. Preferably the rods 32 are of such a length that the end 73 interposed between the saw blades 16 extends past the non-cutting edge of the saw blades 16. As a result, the feeding portions 82 of the rods 32 exert force on the meat section A before, during and after it has been cut. It is particularly important to have force applied in the vicinity of the saw blades 16 because of the tendency of the meat section to bounce up and down during the actual cutting. In particular, tip 66 of rods 32 extends past the non-cutting edge 85 of saw blades 16 and prevents the freshly cut slices from tearing away.

The saw blades 16 are advantageously composed of a hardened tempered steel, and should be capable of cutting through bone. Non-tempered steel has been found unsuitable for cutting bone-in-meat sections. The saw teeth spacing should be preferably in the range 5 to 7 teeth per inch. Wider spacing leads to binding of the blades on the bone portions of meat sections. Narrower spacing leads to smearing of the fat across the surface of the slice, resulting in a poorly dressed product.

The meat itself should be kept relatively cool, preferably between 32° and 36° F. At temperatures above about 36° F. meat sections lack the desirable firmness for satisfactory multi-slice cutting. One exception to this desired cool condition are smoked meats; these have been found to cut satisfactorily even at room temperature.

There are many known ways of arranging cutting edges, such as saw blades, to oscillate in a vertical direction, particularly with adjacent blades moving 180 degrees out of phase. In the present embodiment shown in the drawings, one set of inline saw blades 67 are inserted in a blade frame 68, and a like set of blades 69 are set in another blade frame 70. These blade frames 68, 70 are placed side by side, as shown, to slideably engage in grooved members 71 attached to the supporting frame 11. The blades are so arranged, as shown in FIG. 8, that the blades 69 in blade frame 70 are interposed between the blades 67 of blade frame 68. Thus adjacent blades are attached to opposite blade frames. The cutting edges of blades 67, 69 are kept generally in the same plane by providing notches 72 in the blade frame members through which the blades of the opposed blade frame member may freely pass.

The blade frame members 68, 70 are adapted to reciprocate in opposite directions with respect to each other, and thus to cause blades 67, 69 to oscillate in tandem 180 degrees out of phase. By way of example, FIG. 7 shows that blade frames 68, 70 (blades not shown) can be connected to a frame-pinned shaft 73 by means of rocker-arm assembly 74. Rocker-arm assembly 74 is connected to pinned lever arm 75 which is eccentrically mounted on a wheel 77 driven by motor 78.

The dimensions of the rocker-arm assembly 74 gives a limited range of vertical oscillation to the blade frame 68, 70. Since each saw blade 67 is caused to move in a direction opposite to its neighbor 69, the shear forces caused by the sawing motion of the blades on the meat section A are fairly balanced, thus minimizing the bouncing motions of a meat section trying to "follow the blade."

The blades 16 of the apparatus 10 are designed to yield a plurality of equal-thickness meat slices. The thickness of the cut is a matter of choice and can be fixed by the spacing of the blades 67, 69 in the blade frames 68, 70. Adjustments can be made with respect to the thicknesses of the slices by replacing blade frame members 68, 70 with other frames having blades of desired spacings.

A certain amount of latitude is obtained in accommodating rods 32 to various blade spacings by providing vertical notches 79 therein in the vicinity of the blades 16. However, for major changes in blade spacing, the rods 32 should themselves be replaced by a new set adapted to conform to the desired spacing.

Having thus described the various parts of my invention, the understanding thereof may be illustrated by the following description of its operation.

Initially the operator moves the slideable carriage device 18 away from saw blades 16 by moving lever 19 clockwise. Then the operator depresses foot pedal 62 to raise holding assembly 27 to the position depicted by the dotted lines of FIG. 4.

Thereafter the uncut meat section A is placed in front of ram fins 76 of ram 24 and beneath the raised rods 32. The foot pedal 62 is released, whereupon assembly 27 is released and rods 32 bear on the meat section A.

The slideable carriage 18 is moved forward by moving lever 19 counter-clockwise until fins 76 of ram 24 are in firm engagement with meat section A. Depending upon the configuration of the meat section A, the rods 32 at this time may pivot so that the loading portions thereof are raised against the biasing force of springs 37, 38.

As the carriage 18 is moved toward blades 16 by movement of lever 19, meat section A comes into engagement with the feeding portions 82 of rods 32 and tend to pivot the feeding portions 82 upwards, as shown in FIG. 3, against the biasing force of springs 37, 38. The spring-biased pivotal arrangement of rods 32 permits plate 31 to "ride" the meat section A as its irregular surfaces are forced beneath rods 32 by carriage 18. The initial angular position of rods 32 is such that spring-actuated pressure is inevitably brought to bear upon the meat section A in the vicinity of the saw blades 16.

As the meat section A is forced into oscillating saw blades 16, the extended tips 66 of rods 32 residing on the receiving side 13 of table 12 continue to exert downward pressure on the sliced portions of the meat section A. As the carriage 18 continues to force meat section A through the saw blades 16, the fins 76 pass between adjacent pairs of blades 67, 69 (see FIGS 6). The meat section A emerges on receiving side 13 of table 12 completely sliced, bone and all, and in substantially the same configuration as the original unsliced section.

Thus the apparatus of the present invention provides a simple economical method for converting a whole meat section into a plurality of slices which are in a form adaptable for immediate packaging and sale.

It is appreciated that the embodiment shown in the drawings is intended to be illustrative of the present invention, and variations may be made therein by one skilled in the art without departing from the spirit and scope of this invention.

I claim:

1. An apparatus for cutting a whole meat section into a plurality of slices comprising a frame, a table attached to said frame divided into a first section for receiving said whole meat section and a second section for receiving said meat section in sliced form, a plurality of equally spaced parallel vertical saw blades interposed between said first section and said second section of the table, means for oscillating said saw blades in a vertical direction, movable meat carriage means associated with said first section of said table and initially spaced apart from said saw blades, means connected to said carriage means for moving said movable meat carriage means forward from its initial position towards the cutting edges of said saw blades, holding means associated with said first section of said table comprising a pair of arm bars, each being pivotally connected at one end thereof to said frame at opposite sides of said table, a first support bar pivotally interconnected between said arm bars, a series of equally spaced parallel rods integrally attached to said first support bar at right angles thereto, said rods being oriented so that one end of each rod is disposed between adjacent saw blades and extends beyond the non-cutting edges of said blades and the other end of each bar is positioned over said first section of said table, spring means for biasing said pivotal series of rods in a plane generally parallel to said opposed arm bars and adapted to resist a force applied to the underside of said rods, and means for permitting the introduction of said whole meat section therebeneath.

2. An apparatus for cutting a whole meat section into a plurality of slices comprising a frame, a table attached to said frame having a first section for receiving said meat section and a second section for receiving said meat section in sliced form, a plurality of equally spaced vertical saw blades, power means for oscillating said saw blades in a vertical direction, means for permitting adjacent saw blades to oscillate 180 degrees out of phase, a movable meat carriage extending across said first section of said table so that said carriage is parallel to the plane defined by the edges of said saw blades, said carriage being initially spaced apart from said saw blades, first lever means connected to said carriage for moving said carriage forward from its initial position towards the cutting edges of said saw blades, and meat holding means associated with said first section of said table comprising a pair of arm bars, each being pivotally connected at one end thereof to said frame at opposite sides of said table, a first support bar pivotally interconnected between said arm bars, a series of equally spaced parallel rods integrally attached to said first support bar at right angles thereto, said rods being oriented so that one end of each rod is disposed between adjacent saw blades and extends beyond the non-cutting edges of said blades and the other end of each bar is positioned over said first section of said table, spring means for biasing said pivotal series of rods in a plane generally parallel to said opposed arm bars and adapted to resist a force applied to the underside of said rods, and second lever means supported by said frame for lifting said arm bars at the end thereof opposite said pivoted end.

3. The device according to claim 1 wherein said series of parallel rods is initially aligned approximately in a horizontal plane, and including means for permitting said series of rods to pivot out of said horizontal plane in response to a force applied to the underside thereof, and spring means adapted to bias said series of parallel rods towards its initial position.

4. The apparatus according to claim 1 wherein the cutting edges of said saw blades have between 5 and 7 teeth to the inch.

5. The apparatus according to claim 1 wherein the portion of said rods adjacent to the sides of said saw blades contains a restriction therein.

6. The apparatus according to claim 1 wherein the ends of said rods disposed over said first section of said table have an upward curvature.

7. The apparatus according to claim 1 wherein said saw blades are composed of high-tempered steel.

8. The apparatus according to claim 2 wherein said carriage is spring-biased towards its initial position.

9. An apparatus for cutting a whole meat section into a plurality of slices comprising a frame, a table attached to said frame having a first section for receiving said whole meat section and a second section for receiving said meat section in sliced form, a plurality of equally spaced vertical saw blades composed of tempered steel and having between 5 and 7 teeth per inch, power means for oscillating said saw blades in a vertical direction, means for permitting adjacent saw blades to oscillate 180 degrees out of phase, a movable carriage extending across said first section of said table so that the plane defined by the edge of said carriage nearest said saw blades is parallel to the plane defined by the edges of said saw blades, said carriage being initially spaced apart from said saw blades, first lever means connected to said carriage for moving said carriage forward from its initial position towards the cutting edges of said saw blades, and meat holding means associated with said first section of said table comprising a pair of arm bars each being pivotally connected at one end thereof to said frame at opposite sides of said table, a support bar pivotally interconnected between said arm bars, a series of equally spaced parallel rods integrally attached to said support bar at right angles thereto, said rods being oriented so that one end of each rod is disposed between adjacent saw blades and extends beyond the non-cutting edges of said blades, spring means for biasing said pivotal series of rods in a plane generally parallel to said opposed arm bars and adapted to resist a force applied to the underside of said rods, and second lever means supported by said frame for lifting said arm bars at the end thereof opposite said pivoted end.

References Cited by the Examiner

UNITED STATES PATENTS

| | | | |
|---|---|---|---|
| 84,791 | 12/1868 | Billings | 146—169 |
| 2,147,322 | 2/1939 | Tuthill et al. | 146—153 |
| 2,280,059 | 4/1942 | Brustowsky | 146—153 X |
| 2,353,607 | 6/1944 | Young | 146—169 X |
| 2,578,952 | 12/1951 | Townsend | 146—130 |
| 3,078,893 | 2/1963 | Drong | 146—153 |
| 3,089,526 | 5/1963 | Lykkeberg | 146—153 |

LESTER M. SWINGLE, *Primary Examiner.*

J. SPENCER OVERHOLSER, *Examiner.*